(12) United States Patent
Ake et al.

(10) Patent No.: US 7,750,894 B2
(45) Date of Patent: Jul. 6, 2010

(54) COORDINATES INPUT SYSTEM, COORDINATES INPUT METHOD, COORDINATES INPUT PROGRAM, AND COMPUTER-READABLE STORAGE MEDIUM

(75) Inventors: Yasunori Ake, Kashihara (JP); Hideki Ichioka, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 1328 days.

(21) Appl. No.: 11/227,243

(22) Filed: Sep. 16, 2005

(65) Prior Publication Data

US 2006/0064013 A1    Mar. 23, 2006

(30) Foreign Application Priority Data

Sep. 17, 2004   (JP)   ............................. 2004-272393

(51) Int. Cl.
G06F 3/043   (2006.01)
(52) U.S. Cl. ..................................... 345/177
(58) Field of Classification Search ......... 345/156–158, 345/173, 177, 179; 178/18.01, 18.04, 19.02
See application file for complete search history.

(56) References Cited

U.S. PATENT DOCUMENTS

2003/0144814 A1 * 7/2003 Hama et al. ................. 702/159

FOREIGN PATENT DOCUMENTS

JP    2002-132436 A    5/2002

\* cited by examiner

*Primary Examiner*—Amr Awad
*Assistant Examiner*—Kenneth Bukowski
(74) *Attorney, Agent, or Firm*—Harness, Dickey & Pierce, P.L.C.

(57) ABSTRACT

A first arithmetic section is provided that calculates a first time, which is a time period from a transmission timing of a ultrasonic wave to a reception recognized timing at which a wave height value of the ultrasonic wave received by an ultrasonic wave receiving section crosses a predetermined threshold for a first predetermined number of times. A second arithmetic section is provided that calculates a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again, wherein the second arithmetic means varies the second predetermined number according to the first time. In this way, coordinates of a pointing device employing ultrasonic wave can be obtained with less error variation.

9 Claims, 9 Drawing Sheets

COORDINATES INPUT SYSTEM, COORDINATES INPUT METHOD, COORDINATES INPUT PROGRAM, AND COMPUTER-READABLE STORAGE MEDIUM

This Nonprovisional application claims priority under 35 U.S.C. §119(a) on Patent Application No. 272393/2004 filed in Japan on Sep. 17, 2004, the entire contents of which are hereby incorporated by reference.

FIELD OF THE INVENTION

The present invention relates to a coordinates input system for inputting coordinates of a pointing device, a coordinates input method, a coordinates input program, and a computer-readable storage medium.

BACKGROUND OF THE INVENTION

Conventionally, the pointing device is used to locate a specific point on a computer display, or input tracks for characters or graphics to be displayed on the display. The pointing device comes in various forms as in a mouse, a pen, and a trackball, for example.

Recently, there has been proposed an interesting pen-type pointing device employing ultrasonic wave.

As proposed, a coordinates input system includes, for example, a pen device 110 equipped with an ultrasonic transmitter T on a tip 110a, and a receiver unit 150 including two ultrasonic wave receivers R1 and R2 and connected to a computer 200, as illustrated in FIG. 2. With the coordinates input system, the position information of the pen device 110 is input to the computer 200.

In this system, the velocity of the ultrasonic wave transmitted from the ultrasonic wave transmitter T, and the distance P between the ultrasonic wave receivers R1 and R2 are fixed.

The receiver unit 150 determines a propagation time t1 of the ultrasonic wave transmitted from the ultrasonic wave transmitter T and received by the ultrasonic wave receiver R1, and a propagation time t2 of the ultrasonic wave transmitted from the ultrasonic wave transmitter T and received by the ultrasonic wave receiver R2. By multiplying the velocity of the ultrasonic wave with the propagation time t1 and t2, the distance $L_1$ between the ultrasonic wave transmitter T and the ultrasonic wave receiver R1, and the distance L2 between the ultrasonic wave transmitter T and the ultrasonic wave receiver R2 can be obtained.

FIG. 3 represents a positional relationship between the ultrasonic wave transmitter T and the ultrasonic wave receivers R1 and R2, in which the ultrasonic wave receiver R1 is the origin of the coordinates system. In the coordinates system shown in FIG. 3, if the coordinates of the ultrasonic wave transmitter T is (x, y) in a triangle with apices R1, R2, and T, then triangulation gives:

$$x^2+y^2=L_1^2 \quad (1)$$

$$(x-p)^2+y^2=L_2^2 \quad (2).$$

By transforming Equations (1) and (2), the following Equations (3) and (4) can be obtained.

$$x=(P^2+L_1^2-L_2^2)/2P \quad (3)$$

$$y=(L_1^2-x^2)^{1/2} \quad (4).$$

The coordinates (x, y) of the ultrasonic wave transmitter T can be obtained by substituting the distance $L_1$, $L_2$, and the predefined distance P in Equations (3) and (4), where $L_1$ and $L_2$ are distances respectively obtained from the propagation times t1 and t2 calculated in the receiver unit 150. Since the ultrasonic wave transmitter T is installed in the pen device 110, the coordinates (x, y) can be regarded as the coordinates of the pen device 110. Thus, the coordinates (position information) of the pen device 110 can be obtained by finding the coordinates of the ultrasonic wave transmitter T.

In a coordinates input system (coordinates input device) disclosed in Japanese Laid-Open Patent Publication No. 132436/2002 (Tokukai 2002-132436; published on May 10, 2004), the coordinates of pen device 110 is determined by the following procedure.

First, the propagation time t1 of the ultrasonic wave transmitted from the ultrasonic wave transmitter T and received by the ultrasonic wave receiver R1 is calculated, and the propagation time t1 is multiplied by the velocity of the ultrasonic wave so as to obtain distance L1 between the ultrasonic wave transmitter T and the ultrasonic wave receiver R1. Then, a phase difference between the ultrasonic wave received by the ultrasonic wave receiver R1 and the ultrasonic wave received by the ultrasonic wave receiver R2 is calculated, and the distance between $L_1$ and $L_2$ is determined from the phase difference. The distance $L_2$ between the ultrasonic wave transmitter T and the ultrasonic wave receiver R2 is then obtained from the distance $L_1$ and the difference between the distance $L_1$ and distance $L_2$. Then, the coordinates (x, y) of the ultrasonic wave transmitter T are obtained by substituting the distance $L_1$, $L_2$, and P in Equations (3) and (4), thereby obtaining the coordinates of the pen device 110 equipped with the ultrasonic wave transmitter T.

Further, in the coordinates input system of the foregoing publication, the propagation time t1 of the ultrasonic wave transmitted from the ultrasonic wave transmitter T and received by the ultrasonic wave receiver R1 is obtained as follows.

First, in the pen device 110, the ultrasonic wave transmitter T transmits an ultrasonic wave, and an infrared emitting element transmits an infrared synchronization signal indicative of a transmission timing of the ultrasonic wave.

The ultrasonic wave receiver R1 receives the ultrasonic wave, and determines an envelope of the received ultrasonic wave. Then, the transmission timing of the ultrasonic wave is detected based on the infrared synchronization signal, so as to obtain a propagation time of the ultrasonic wave, which is the time period from the transmission timing of the ultrasonic wave to the timing at which the envelope exceeds a predetermined threshold (see paragraph [0024] and FIG. 5 of Tokukai 2002-132436).

However, the propagation time obtained by the foregoing process has error variations according to the distance between the ultrasonic wave receiver R1 and the ultrasonic wave transmitter T. This is described below in detail.

The characteristics of the received ultrasonic wave are such that the overall height of the amplitude fluctuates depending on the distance between the transmission source and the receiver. Thus, with the predetermined threshold held at a constant level, the time period from the reception of the ultrasonic wave to the point where the envelope exceeds the predetermined threshold varies depending on the distance between the ultrasonic wave transmitter T and the ultrasonic wave receiver R1, with the result that the propagation time of the ultrasonic wave is obtained with error variations.

More specifically, when the distance between the ultrasonic wave transmitter T and the ultrasonic wave receiver R1 changes, the position of the amplitude that exceeds the envelope may be changed in the received ultrasonic wave. This changes the time period from the reception of the ultrasonic wave to the point where the envelope crosses the predetermined threshold, with the result that the resulting propagation time varies depending on the distance. (For example, with an ultrasonic wave of a certain propagation distance, the envelope exceeds a predetermined threshold at the rise of the first amplitude. However, if the propagation distance is changed, the envelope may exceed the predetermined threshold at the rise of the third amplitude.)

In the manner described above, the propagation time of the detected ultrasonic wave is obtained with error variations depending on the position of the pen device 110 relative to the ultrasonic wave receiver R1. There according will be error variations in the coordinates of the pointing device calculated based on the propagation time.

SUMMARY OF THE INVENTION

An object of the present invention is to provide a coordinates input system for suppressing error variations in the coordinates of a pointing device employing ultrasonic wave, a coordinates input method, a coordinates input program, and a computer-readable storage medium.

In order to achieve the foregoing object, a coordinates input system according to the present invention includes: a pointing device including an ultrasonic wave transmitting section; an ultrasonic wave receiving section for receiving an ultrasonic wave transmitted from the ultrasonic wave transmitting section; a coordinates calculating section for calculating coordinates of the pointing device based on a propagation time of the ultrasonic wave transmitted from the ultrasonic wave transmitting section and received by the ultrasonic wave receiving section; a first arithmetic section for calculating a first time, which is a time period from the transmission timing of the ultrasonic wave to a reception recognized timing at which a wave height value of the ultrasonic wave received by the ultrasonic wave receiving section crosses a predetermined threshold for a first predetermined number of times; and a second arithmetic section for calculating a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again, wherein the second arithmetic section varies the second predetermined number according to the first time.

According to the foregoing configuration, the first arithmetic section calculates a first time, which is a time period from the transmission timing of the ultrasonic wave to a reception recognized timing at which a wave height value of the ultrasonic wave received by the ultrasonic wave receiving section crosses a predetermined threshold for a first predetermined number of times. Based on the duration of the first time, a rough estimate of the propagation distance can be made for the ultrasonic wave transmitted from the ultrasonic wave transmitting section and received by the ultrasonic wave receiving section.

According to the foregoing configuration, the second arithmetic section calculates a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again.

Here, the height of amplitudes of the ultrasonic wave varies depending on the propagation distance. Accordingly, the number of amplitudes that exceed the predetermined threshold during a certain time period after the reception of the ultrasonic wave also varies according to the propagation distance.

In view of such, according to the foregoing configuration, the second predetermined number is changed according to the first time (rough estimate of the distance between the ultrasonic wave transmitter and the ultrasonic wave receiver). By changing the second predetermined number such that the same number of amplitudes is always obtained from the reception of the ultrasonic wave to a reception confirmed timing regardless of the propagation time, a substantially constant time period can be obtained from the reception of the ultrasonic wave to the reception confirmed timing.

By calculating the coordinates of the pointing device based on the propagation time of the ultrasonic wave, variations in the coordinates due to the propagation distance of the ultrasonic wave can be suppressed.

In order to achieve the foregoing object, the present invention provides a coordinates input method in which coordinates of a pointing device including an ultrasonic wave transmitting section is calculated based on a propagation time of a ultrasonic wave transmitted from the ultrasonic wave transmitting section and received by an ultrasonic wave receiving section, the method including: the first step of calculating a first time, which is a time period from the transmission timing of the ultrasonic wave to a reception recognized timing at which a wave height value of the ultrasonic wave received by the ultrasonic wave receiving section crosses a predetermined threshold for a first predetermined number of times; and the second step of calculating a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again, wherein the second arithmetic section varies the second predetermined number according to the first time.

According to the foregoing procedure, the method calculates a first time, which is a time period from the transmission timing of the ultrasonic wave to a reception recognized timing at which a wave height value of the ultrasonic wave received by the ultrasonic wave receiving section crosses a predetermined threshold for a first predetermined number of times. Based on the duration of the first time, a rough estimate of the propagation distance can be made for the ultrasonic wave transmitted from the ultrasonic wave transmitting section and received by the ultrasonic wave receiving section.

According to the foregoing procedure, the method calculates a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again.

Here, the height of amplitudes of the ultrasonic wave varies depending on the propagation distance. Accordingly, the number of amplitudes that exceed the predetermined threshold during a certain time period after the reception of the ultrasonic wave also varies according to the propagation distance.

In view of such, according to the foregoing procedure, the second predetermined number is changed according to an estimated distance between the ultrasonic wave transmitter and the ultrasonic wave receiver (first time). By changing the second predetermined number such that the same number of amplitudes is always obtained from the reception of the ultrasonic wave to a reception confirmed timing regardless of the propagation time, a substantially constant time period can be obtained from the reception of the ultrasonic wave to the reception confirmed timing.

By calculating the coordinates of the pointing device based on the propagation time of the ultrasonic wave, error variations of the coordinates due to the propagation distance of the ultrasonic wave can be suppressed.

For a fuller understanding of the nature and advantages of the invention, reference should be made to the ensuing detailed description taken in conjunction with the accompanying drawings.

DESCRIPTION OF THE EMBODIMENTS

Referring to FIG. 1 through FIG. 9, the following will describe one embodiment of the present invention.

A coordinates input system according to the present embodiment may have the same external structure as that described in the BACKGROUND OF THE INVENTION section. As such, as to the external structure of the coordinates input system according to the present embodiment, description will be based on FIG. 2 used for the description of the background art.

Figure 2:
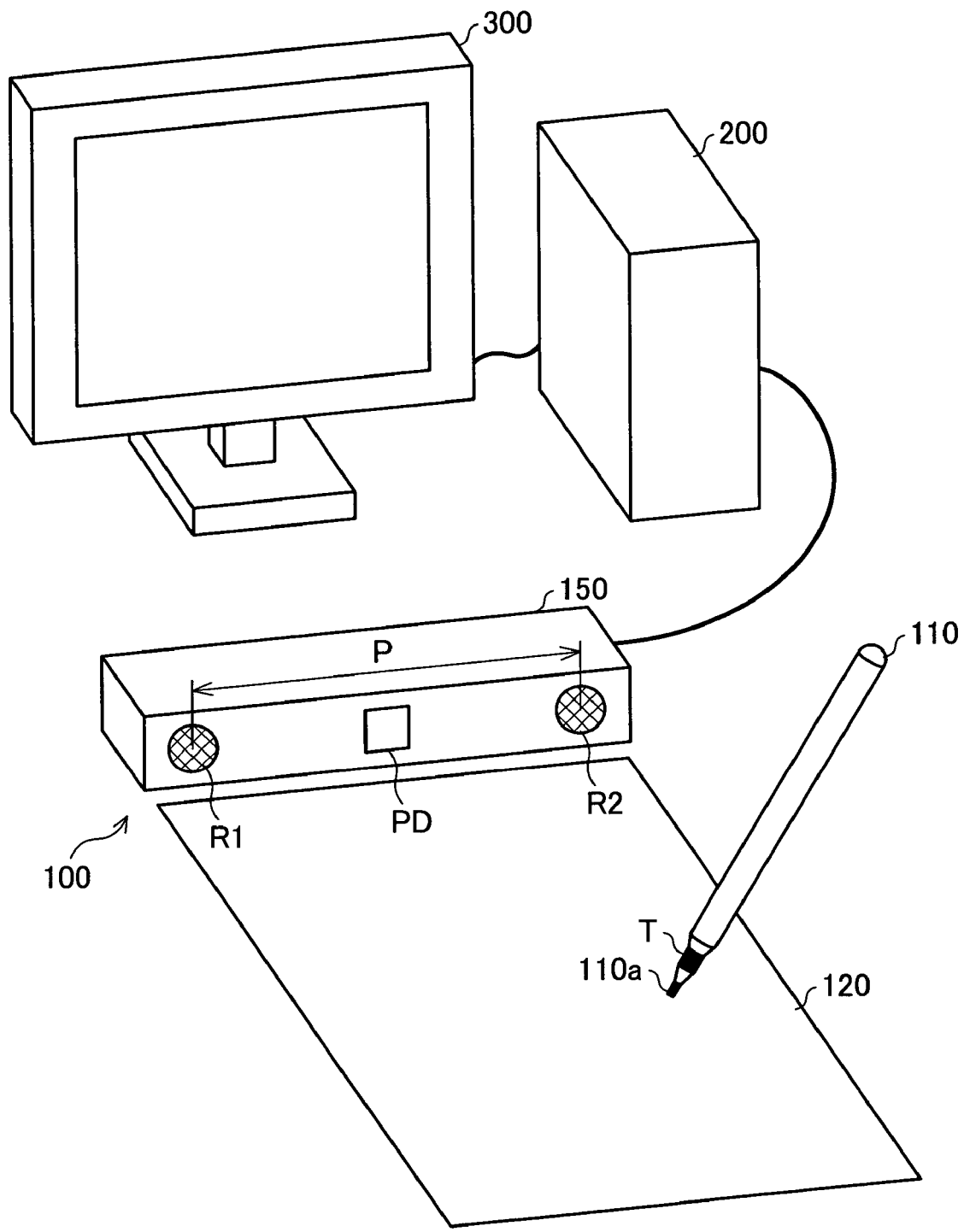
FIG. 2 is a view illustrating an external structure of the coordinate input system.
Figure 3:
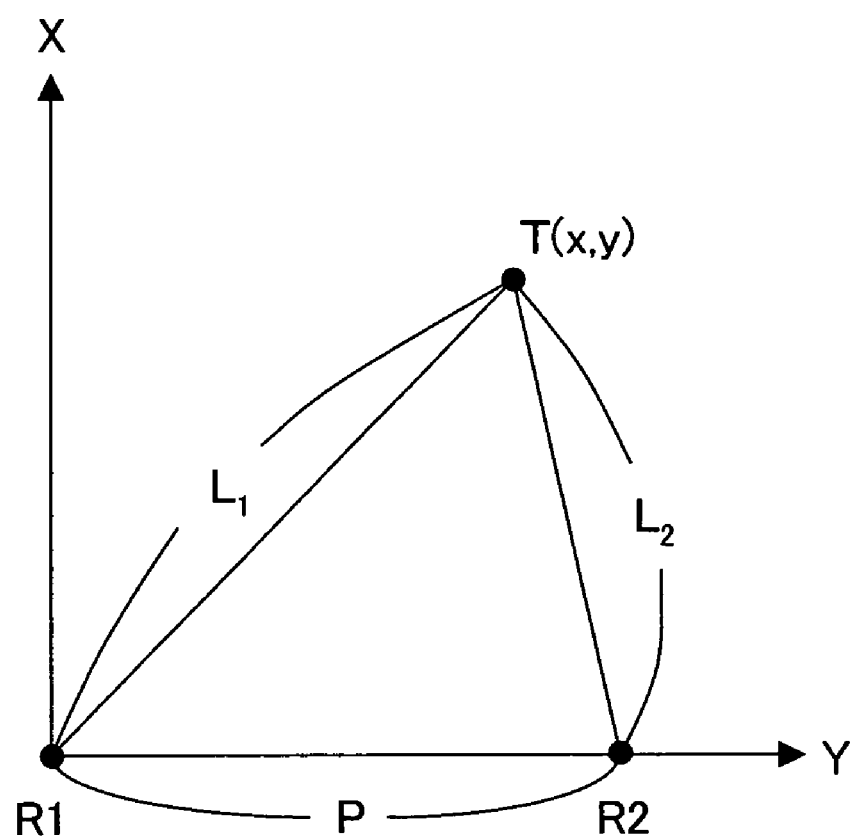
FIG. 3 is a view explaining the principle of triangulation.
Figure 4:
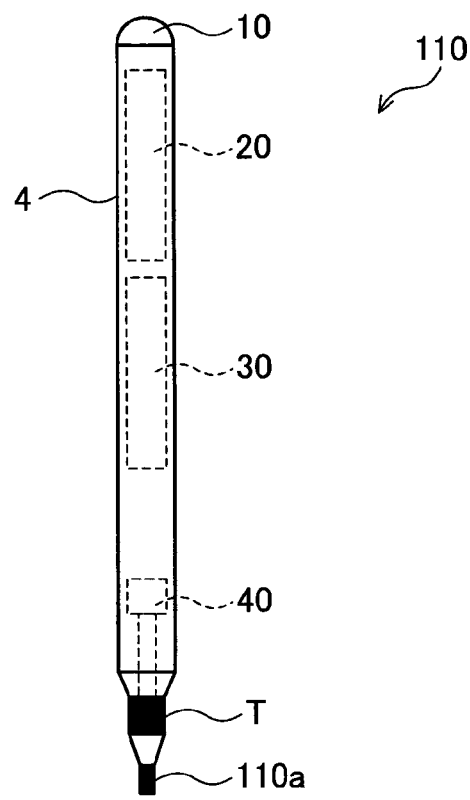
FIG. 4(a) is a view illustrating an internal structure of a pen device provided as one component of the coordinates input system.
FIG. 4(b) is a block diagram illustrating hardware structures of the pen device.
Figure 4:
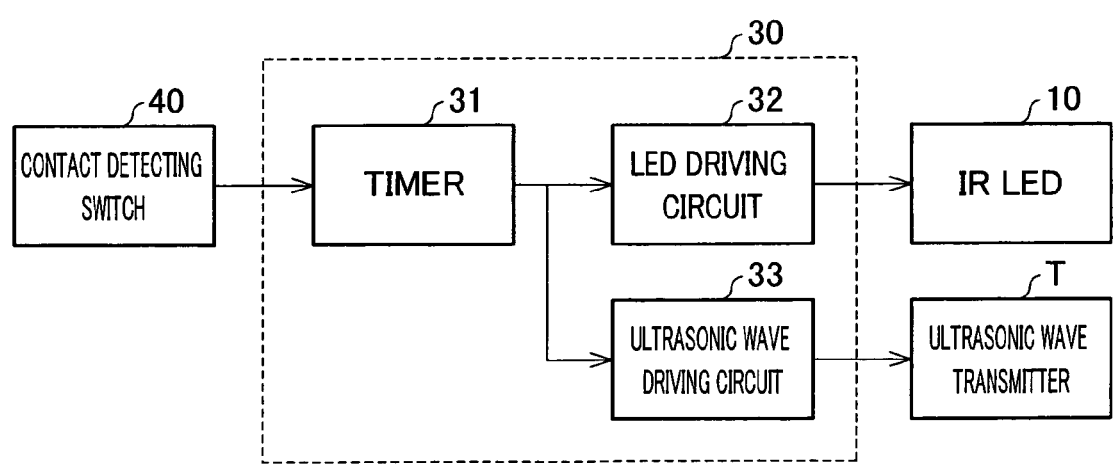

As illustrated in FIG. 2, a coordinates input system 1 includes a pen device 110, an input face 120, and a receiver unit 150. The receiver unit 150 is connected to a computer 200. The computer 200 is connected to a monitor 300.

The pen device 110 is a pointing device employing ultrasonic wave. Specifically, with a tip 110a of the pen device 110 brought into contact with the input face 120 by a user, the pen device 110 transmits ultrasonic wave and infrared light. As to a specific structure of the pen device 110, details will be described later.

The receiver unit 150 receives the ultrasonic wave and infrared light sent out from the pen device 110. Based on the ultrasonic wave and infrared light, the receiver unit 150 detects coordinates of the pen device 110 with reference to the input face 120 as a coordinate plane, and inputs the coordinates to the computer 200.

The input face 120 is a contact pad for the tip 110a of the pen device 110. The material of the input face 120 is not particularly limited as long as it has a smooth surface. For example, paper, board, metal, and various types of chemical products may be used.

The monitor 300 is a display for displaying images based on data processed by the computer 200. The monitor 300, which is a liquid crystal display in this embodiment, is not particularly limited, and may be realized by a plasma display, a CRT (Cathode Ray Tube), an organic EL (Electro Luminescence) display, or an inorganic EL display, for example.

The computer 200 is operable to move a cursor or the like displayed on the monitor 300, or create graphics, based on the coordinates entered through the receiver unit 150. Specifically, when a user drags the pen device 110 on the input face 120, the computer 200 moves a cursor on the monitor 300 relative to the pen movement, and creates graphics on the display of the monitor 300 according to the movement of the pen device 110.

Referring to FIGS. 4(a) and 4(b), the following will describe a specific structure of the pen device 110. FIG. 4(a) illustrates an internal structure of the pen device 110. FIG. 4(b) is a block diagram showing a hardware structure of the pen device 110.

As shown in FIGS. 4(a) and 4(b), the pen device 110 includes an infrared LED (light emitting diode) 10, a battery 20, a driving circuit 30, a contact detecting switch 40, and an ultrasonic wave transmitter T.

The battery 20 supplies power to drive the hardware structures of the pen device 110.

The contact detecting switch 40 is a device which supplies an electrical signal to the driving circuit 30 when the tip 110a touches the input face 120.

The driving circuit 30 is used to drive the infrared LED 10 and the ultrasonic transmitter T based on the electrical signal supplied from the contact detecting switch 40. The driving circuit 30 includes a timer 31, an LED driving circuit 32, and an ultrasonic wave driving circuit 33.

The timer 31 periodically sends a trigger signal to the LED driving circuit 32 and the ultrasonic wave driving circuit 33 in response to the electrical signal sent from the contact detecting switch 40.

The LED driving circuit 32 is a driver for driving the infrared LED 10 at the timing of the trigger signal supplied from the timer 31.

The ultrasonic driving circuit 33 is a driver for driving the ultrasonic wave transmitter T at the timing of the trigger signal supplied from the timer 31.

Figure 5:
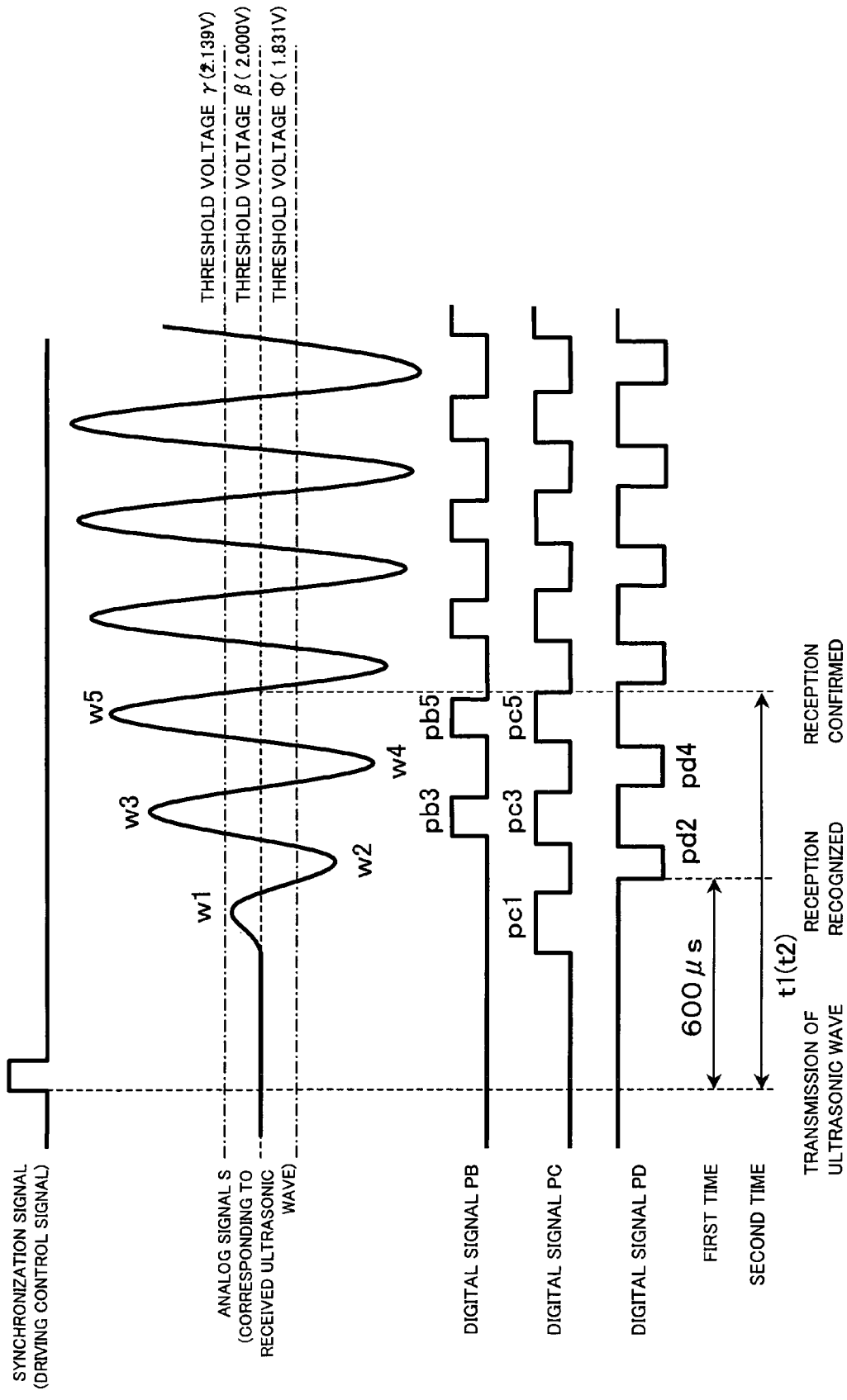
FIG. 5 is a waveform diagram for an ultrasonic wave whose transmission timing and reception recognized timing are separated by 600 μs and whose reception confirmed timing occurs at a fall of the waveform, representing an analog signal converted from the ultrasonic wave, digital signals generated from the analog signal, and a synchronization signal indicative of a transmission timing.

The infrared LED 10 is a light emitting element for emitting an infrared synchronization signal by being driven by the LED driving circuit 32. As used herein, the "synchronization signal" refers to a signal whose pulse rises at the timing when the ultrasonic wave is transmitted, as shown in FIG. 5.

The ultrasonic wave transmitter (ultrasonic wave transmitting means) T is driven by the ultrasonic wave driving circuit 33 and transmits a ultrasonic wave with a velocity V (about 364 m/s at 20° C.). With the foregoing configuration, the pen device 110 transmits an IR synchronization signal and an ultrasonic wave when the tip 110a touches the input face 120.

Figure 1:
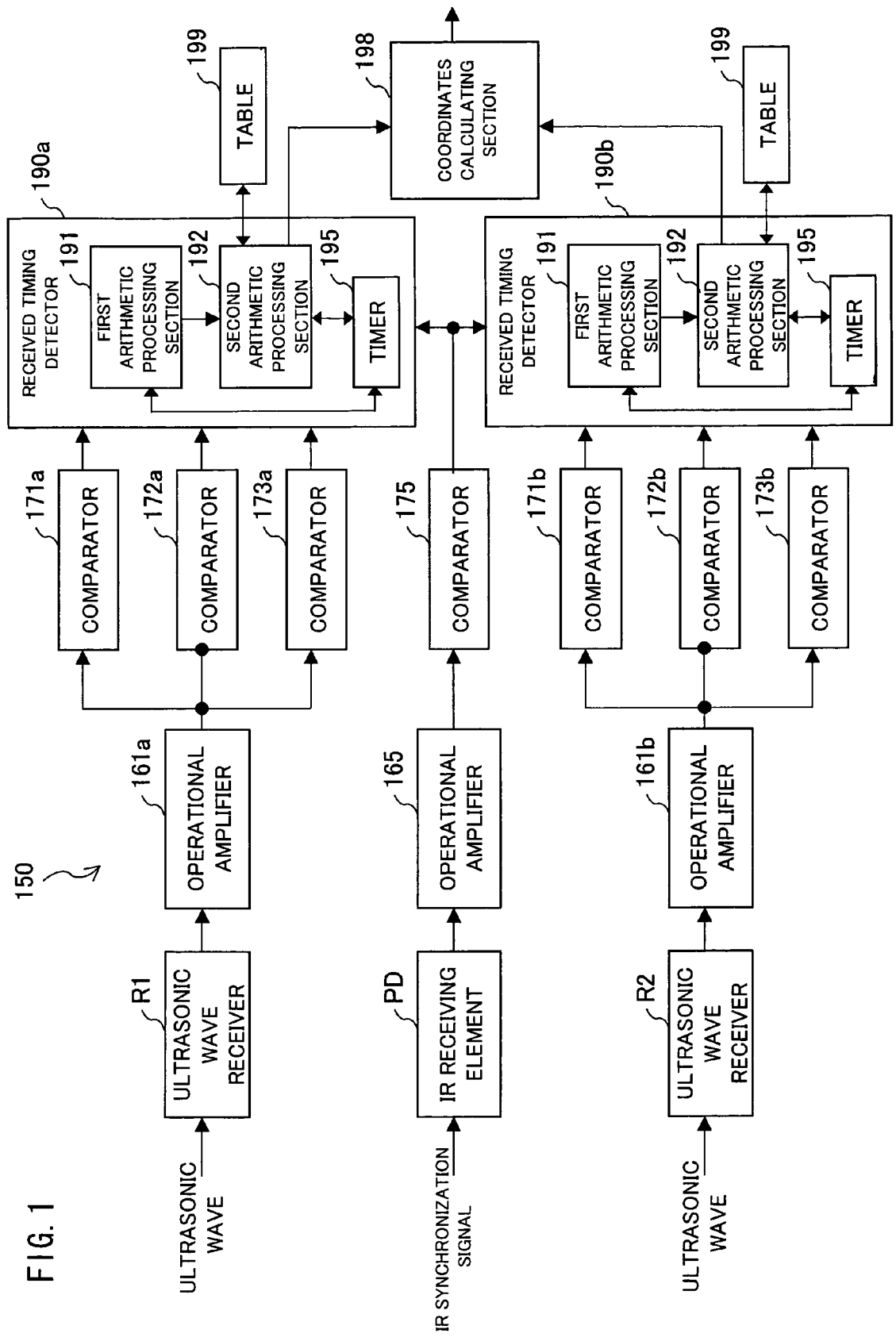
FIG. 1 is a block diagram showing an internal structure of a receiver unit provided in a coordinates input system according to one embodiment of the present invention.

Referring to FIG. 1, the following will describe a specific structure of the receiver unit 150. FIG. 1 is a block diagram showing hardware structures of the receiver unit 150.

As shown in FIG. 1, the receiver unit 150 includes ultrasonic wave receivers R1 and R2, an infrared receiving element PD, operational amplifiers 161 and 165, comparators 171 through 173, and 175, a received timing detector 190, and a coordinates calculating section 198. The ultrasonic wave receivers R1 and the ultrasonic wave receiver R2 are disposed with a predetermined distance therebetween, as shown in FIG. 2.

The infrared receiving element PD receives the IR synchronization signal from the infrared LED 10, and sends it to the operational amplifier 165.

The operational amplifier 165 amplifies the synchronization signal sent from the infrared receiving element PD, and outputs the amplified synchronization signal to the comparator 175.

The comparator 175 outputs a driving control signal at the rise of a pulse of the synchronization signal supplied from the operational amplifier 165, the driving control signal being an instruction signal for starting driving of a timer 195 provided in each of received timing detectors 190a and 190b.

Upon receiving the ultrasonic wave from the ultrasonic wave transmitter T, the ultrasonic wave receiver (ultrasonic wave receiving means, first receiving section) R1 converts the ultrasonic wave into an analog signal (analog voltage) S, and sends the analog signal S to the operational amplifier 161a. The ultrasonic wave receiver R2 is functionally the same as the ultrasonic wave receiver R1, but differs from its counterpart in that the analog signal S is sent to the operational amplifier 161b.

The operational amplifier 161a amplifies the analog signal S sent from the ultrasonic wave receiver R1, and outputs the amplified analog signal S to each of the comparators 171a, 172a, and 173a.

The operational amplifier 161b is functionally the same as the operational amplifier 161a, but differs from its counterpart in that it receives the analog signal S sent from the ultrasonic wave receiver R2, and that the amplified analog signal S is supplied to each of the comparators 171b, 172b, and 173b.

In the comparator 172a, the voltage of the analog signal S supplied from the operational amplifier 161a is compared with threshold voltage β, and a digital signal PC is generated based on the result of comparison. The digital signal PC is then supplied to the received timing detector 190a. The comparator 172a produces an ON voltage (for example, 3.3 V) for the digital signal PC if the voltage of the analog signal S exceeds the threshold voltage β, and an OFF voltage (for example, 0 V) for the digital signal PC if the voltage of the analog signal S is at or below the threshold voltage β.

As shown in FIG. 5, the threshold voltage β set for the comparator 172a corresponds to the center (amplitude=0, zero-cross point) of the analog signal S (analog signal corresponding to the received ultrasonic wave) sent from the operational amplifier 161a, and it is set to 2V for example. Accordingly, as shown in FIG. 5, the digital signal PC sent from the comparator 172a has ON voltage when the voltage of the analog signal S exceeds the zero-cross point (wave height), and OFF voltage when the analog signal S is at or below the zero-cross point.

Thus, as shown in FIG. 5, the digital signal PC has pulses pc1, pc3, and pc5 respectively corresponding to positive amplitudes w1, w3, and w5 of the analog signal S, and the fall of the pulses pc1, pc3, and pc5 coincides with the zero-cross point at the fall of the positive amplitudes w1, w3, and w5. That is, by detecting the fall timing of the pulse waveforms of the digital signal PC, the timing at which the fall of the analog signal S crosses the zero-cross point can be detected.

The comparator 172b is functionally the same as the comparator 172a, but differs from its counterpart in that it receives the analog signal S sent from the operational amplifier 161b, and that the digital signal PC is sent to the received timing detector 190b.

In the comparator 171a, the voltage of the analog signal S supplied from the operational amplifier 161b is compared with threshold voltage γ (predetermined threshold, threshold γ), and a digital signal PB is generated based on the result of comparison. The digital signal PB is then supplied to the received timing detector 190a. The comparator 171a produces an ON voltage for the digital signal PB when the voltage of the analog signal S exceeds the threshold voltage γ, and an OFF voltage for the digital signal PB when the voltage of the analog signal S is at or below the threshold voltage γ.

As shown in FIG. 5, the threshold voltage γ set for the comparator 171a is the sum of a predetermined voltage and the voltage that corresponds to the center of the analog signal S (analog signal corresponding to the received ultrasonic wave). For example, the threshold voltage γ is 2.139 V when the voltage corresponding to the center is 2 V and the predetermined voltage is 0.139 V. Accordingly, as shown in FIG. 5, the digital signal PB sent from the comparator 171a has ON voltage when the voltage of the analog signal S exceeds the threshold voltage γ above the center, and OFF voltage when the analog signal S is at or below the threshold voltage γ. In other words, the digital signal PB rises or falls every time the voltage of the analog signal S crosses the threshold voltage γ, as shown in FIG. 5. That is, by detecting the rise and fall timings of pulses pb3 and pb5 of the digital signal PB, the timing at which the voltage of the analog signal S crosses the threshold voltage γ can be detected.

The comparator 171b is functionally the same as the comparator 171a, but differs from its counterpart in that it receives the analog signal S sent from the operational amplifier 161b, and that the digital signal PB is sent to the received timing detector 190b.

In the comparator 173a, the voltage of the analog signal S supplied from the operational amplifier 161a is compared with threshold voltage Φ (predetermined threshold, threshold Φ), and a digital signal PD is generated based on the result of comparison. The digital signal PD is then supplied to the received timing detector 190*a*. The comparator 173*a* produces an ON voltage for the digital signal PD when the voltage of the analog signal S exceeds the threshold voltage Φ, and an OFF voltage for the digital signal PD when the voltage of the analog signal S is at or below the threshold voltage Φ.

As shown in FIG. 5, the threshold voltage Φ set for the comparator 173*a* is a voltage obtained by subtracting a predetermined voltage from the voltage that corresponds to the center of the analog signal S sent from the operational amplifier 161*a*. For example, the threshold voltage Φ is 1.831 V when the voltage corresponding to the center is 2 V and the predetermined voltage is 0.169 V. Accordingly, as shown in FIG. 5, the digital signal PD sent from the comparator 173*a* has ON voltage when the voltage of the analog signal S exceeds the threshold voltage Φ below the center, and OFF voltage when the analog signal S is at or below the threshold voltage Φ. In other words, the digital signal PD rises or falls every time the voltage of the analog signal S crosses the threshold voltage Φ, as shown in FIG. 5. That is, by detecting the rise and fall timings of pulses pd2 and pd4 of the digital signal PD, the timing at which the voltage of the analog signal S crosses the threshold voltage Φ can be detected.

The comparator 173*b* is functionally the same as the comparator 173*a*, but differs from its counterpart in that it receives the analog signal S sent from the operational amplifier 161*b*, and that the digital signal PD is sent to the received timing detector 190*b*.

The received timing detector 190*a* is a functional block realized by arithmetic means such as an arithmetic circuit or a processor. The received timing detector 190*a* determines a propagation time t1 of the ultrasonic wave transmitted from the ultrasonic transmitter T and received by the ultrasonic wave receiver R1, based on the driving control signal sent from the comparator 175, and the digital signals PB, PC, and PD respectively sent from the comparators 171*a*, 172*a*, and 173*a*.

The received timing detector 190*b* is functionally the same as the received timing detector 190*a*, but differs from its counterpart in that it receives the digital signals PB, PC, and PD respectively sent from the comparators 171*b*, 172*b*, and 173*b*, and that it outputs a propagation time t2 of the ultrasonic wave transmitted from the ultrasonic wave transmitter T and received by the ultrasonic wave receiver R2.

The received timing detectors 190*a* and 190*b* each include a first arithmetic processing section 191, a second arithmetic processing section 192, and a timer 195.

Based on the driving control signal, the first arithmetic processing section (first arithmetic means) 191 detects a transmission timing, which is the timing at which the ultrasonic wave is transmitted by the ultrasonic wave transmitter T (first step). Then, based on the digital signals PB and PD, the first arithmetic processing section 191 detects a reception recognized timing, which is the timing at which the voltage of the analog signal S first crosses the threshold voltage γ or Φ (first step). Then, using the timer 195, the first arithmetic processing section 191 then calculates a first time, which is the time period from the transmission timing to the reception recognized timing (first step).

Based on the driving control signal, the second arithmetic processing section (second arithmetic means) 192 detects the transmission timing (second step). Then, based on the digital signals PB, PC, and PD, the second arithmetic processing section 192 detects a reception confirmed timing, which is the timing of the first occurrence of the zero-cross point after the voltage of the analog signal S has crossed the threshold voltages γ and Φ for a predetermined number of times X (second predetermined number) (second step). Then, using the timer 195, the second arithmetic processing section 192 calculates a second time, which is the time period from the transmission timing to the reception confirmed timing, and outputs the second time as a propagation time t1 (t2) to the coordinates calculating section 198 (second step).

As to the specific processes performed by the first and second arithmetic processing sections 191 and 192, detailed description will be given later.

Figure 7:
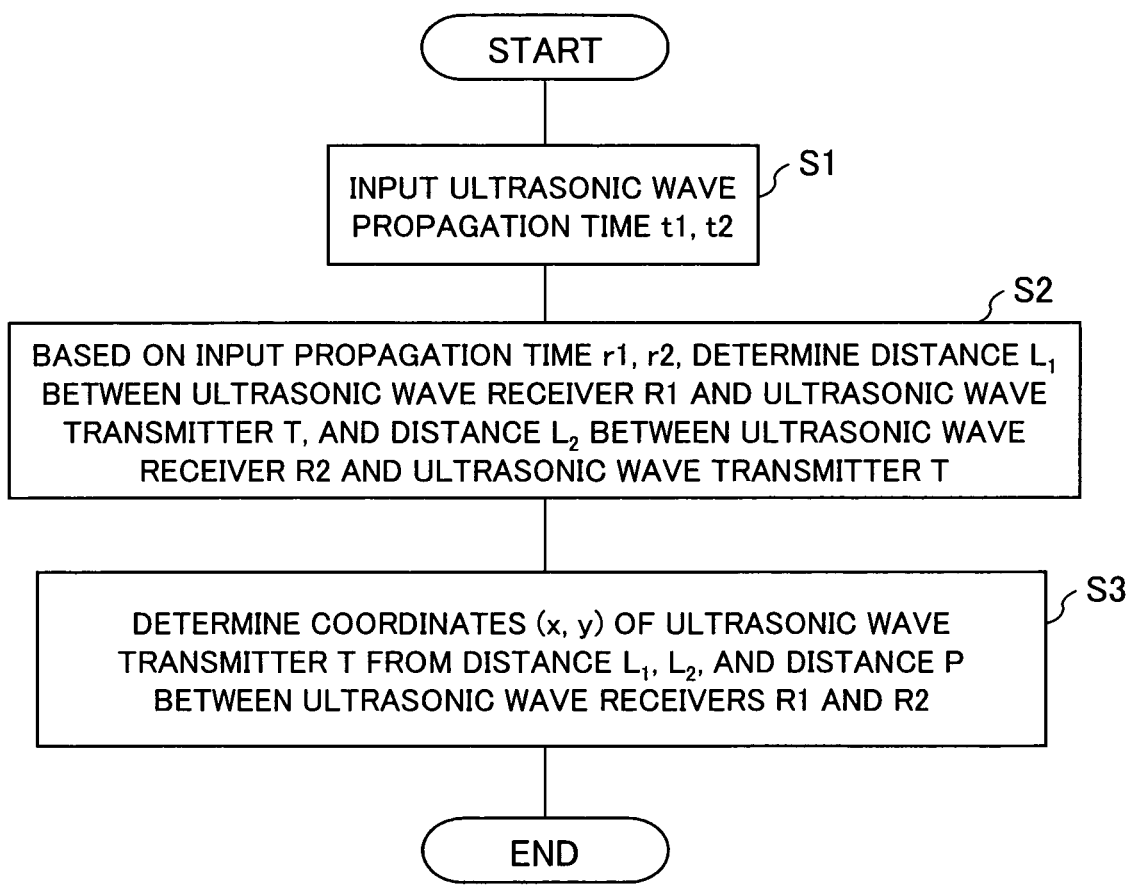
FIG. 7 is a flowchart representing the procedure of calculating coordinates in a coordinates calculating section provided as a component of the receiver unit shown in FIG. 1.

The coordinates calculating section 198 determines coordinates (x, y) of the ultrasonic wave detector T based on (i) the propagation times t1 and t2 sent from the received timing detectors 190*a* and 190*b*, and (ii) the distance P between the ultrasonic wave receiver R1 and the ultrasonic wave receiver R2. Since this is performed based on the principle of triangulation as described in the BACKGROUND OF THE INVENTION section, only brief description is given below. FIG. 7 is a flowchart representing the procedures performed by the coordinates calculating section 198.

Referring to FIG. 7, the coordinates calculating section 198 first receives the propagation times t1 and t2 (S1).

Then, the coordinates calculating section 198 multiplies the propagation time t1 by the velocity V of the ultrasonic wave transmitted by the ultrasonic wave transmitter T, so as to determine the distance L1 between the ultrasonic wave transmitter T and the ultrasonic wave receiver R1. Further, the coordinates calculating section 198 multiplies the propagation time t2 by the velocity V of the ultrasonic wave transmitted by the ultrasonic wave transmitter T, so as to determine the distance L2 between the ultrasonic wave transmitter T and the ultrasonic wave receiver R2 (S2).

By substituting the distances L1, L2, and the distance P between the ultrasonic wave receivers R1 and R2 in Equations (3) and (4), the coordinates calculating section 198 calculates coordinates (x, y) of the ultrasonic wave transmitter T (S3). Owning to the fact that the ultrasonic wave transmitter T is provided in the pen device 110, the coordinates (x, y) of the ultrasonic wave transmitter T can be regarded as the coordinates of the pen device 110. Thus, the coordinates of the pen device 110 can be obtained by finding the coordinates of the ultrasonic wave transmitter T.

The following describes specific processes performed by the first arithmetic processing section 191 and the second arithmetic processing section 192.

Upon receiving the driving control signal from the comparator 175, the first arithmetic processing section 191 and the second arithmetic processing section 192 drive the timer 195 to start clocking at the rise of a pulse waveform of the driving control signal. Since the rise of a pulse waveform of the driving control signal indicates the rise of the infrared synchronization signal, the clocking is started at the timing (transmission timing) when the ultrasonic wave transmitter T transmits the ultrasonic wave (see FIG. 5).

During clocking, the first arithmetic processing section 191 detects a reception recognized timing, which is the timing at which the voltage of the analog signal S first crosses the threshold voltage γ or Φ. More specifically, the first arithmetic processing section 191 detects, whichever comes first, the first rise of the digital signal PB or the first fall of the digital signal PD, and obtain the detected timing as a reception recognized timing (see FIG. 5).

In the example of FIG. 5, upon detecting a fall of the pulse pd2, the first arithmetic processing section 191 obtains the detected timing as a reception confirmed timing.

Then, using the timer 195, the first arithmetic processing section 191 calculates a first time, which is the time period from the transmission timing to the reception recognized timing, and sends the first time to the second arithmetic processing section 192. In the example of FIG. 5, the first time is 600 μs.

Then, during clocking, the second arithmetic processing section 192 detects a reception confirmed timing, which is the timing of the first occurrence of the zero-cross point after the voltage of the analog signal S has crossed the threshold voltages γ and Φ for a predetermined number of times X (second predetermined number). More specifically, the second arithmetic processing section 192 detects the first fall of the pulse of the digital signal PC after the pulses of the digital signals PB and PD have risen and fallen for a predetermined number of times X. The detected timing is obtained as a reception confirmed timing.

Note that, the second arithmetic processing section 192 performs an additional process of determining the predetermined number X based on the first time sent from the first arithmetic processing section 191, by referring to a table 199. Details of this process will be described later.

In the example of FIG. 5, the predetermined number X is 8.

Specifically, in the example of FIG. 5, the second arithmetic processing section 192 successively detects the fall and rise of the pulse pd2, the rise and fall of the pulse pb3, the fall and rise of the pulse pd4, and the rise and fall of the pulse pb5 from the digital signals PB and PD. Immediately thereafter, the second arithmetic processing section 192 detects the fall of the pulse pc5 in the digital signal PC, and obtains the detected timing as a reception confirmed timing.

Then, using the timer 195, the second arithmetic processing section 192 calculates a second time, which is the time period from the transmission timing to the reception confirmed timing.

The second time obtained by the second arithmetic processing section 192 of the received timing detector 190a is sent to the coordinates calculating section 198 as the propagation time t1 of the ultrasonic wave transmitted from the ultrasonic wave transmitter T and received by the ultrasonic wave receiver R1. Likewise, the second time obtained by the second arithmetic processing section 192 of the received timing detector 190b is sent to the coordinates calculating section 198 as the propagation time t2 of the ultrasonic wave transmitted from the ultrasonic wave transmitter T and received by the ultrasonic wave receiver R2.

As described above, in order to detect the reception confirmed timing, the second arithmetic processing section 192 counts the number of times (predetermined number X, second predetermined number) the voltage of the analog signal S crosses the threshold voltages γ and Φ. What should be noted in the present embodiment is that the predetermined number X is determined based on the first time sent from the first arithmetic processing section 191, referring to the table 199.

This is described below in more detail.

In the case where the ultrasonic wave has a first time of 600 μs as in the example shown in FIG. 5, the voltage with the amplitude w1 in the analog signal S does not cross the threshold voltage γ, and therefore the digital signal PB does not have a pulse pb1 to be detected. However, since the voltages with the amplitudes w2 through w5 cross the threshold voltage γ or Φ, the pulses pd2, pb3, pd4, and pb5 are detected in the digital signals PB and PD.

Figure 6:
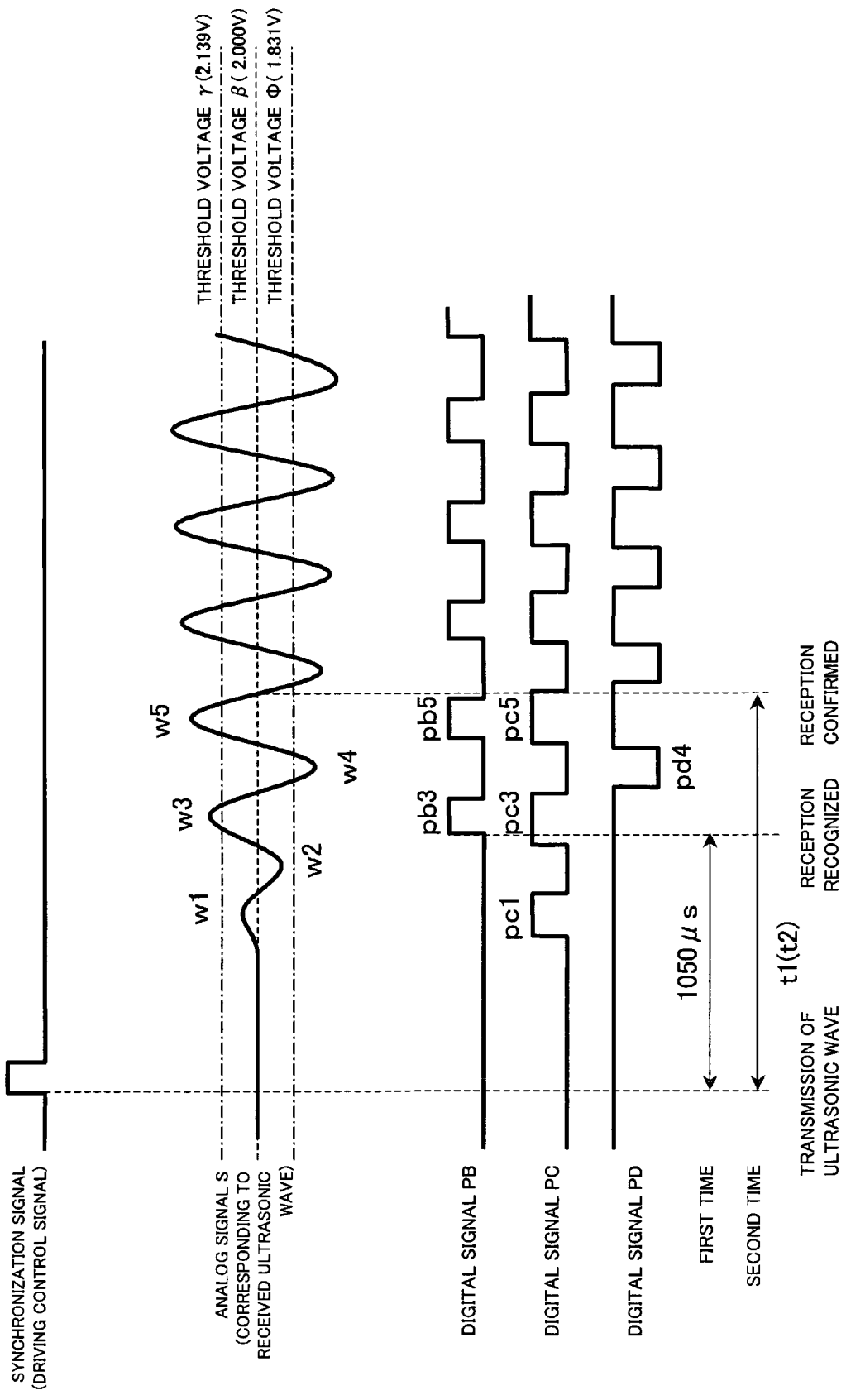
FIG. 6 is a waveform diagram for an ultrasonic wave whose transmission timing and reception recognized timing are separated by 1050 μs and whose reception confirmed timing occurs at a fall of the waveform, representing an analog signal converted from the ultrasonic wave, digital signals generated from the analog signal, and a synchronization signal indicative of a transmission timing.

In contrast, as shown in FIG. 6, in the ultrasonic wave with a first time of 1050 μs for example, the voltage with the amplitude w1 of the analog signal S does not cross the threshold voltage γ, and the voltage with the amplitude w2 in the analog signal S does not cross the threshold voltage Φ. As such, the digital signals PB and PD do not have a pulse pb1 and pd2 to be detected, respectively. The voltages with the amplitudes w3 through w5 cross the threshold voltage γ or Φ, and accordingly the pulses pb3, pd4, and pb5 are detected in the digital signals PB and PD.

In this manner, with a longer first time, the position of the first detected pulse in the digital signals PB and PD is changed. That is, with a longer first time, the first occurrence of the amplitude that crosses the threshold voltage γ or Φ is delayed.

This is due to the property of the ultrasonic wave that the overall amplitude becomes smaller as the distance between the transmission source and the receiver is increased, even though the amplitude progressively increases on the time axis. This is described below in detail.

The propagation distance from the transmission source to the receiver is longer for the ultrasonic wave with a first time of 1050 μs than for the ultrasonic wave with a first time of 600 μs. Accordingly, the overall amplitude is smaller in the former, as shown in FIG. 5 and FIG. 6.

The amplitude progressively increases on the time axis in both of these ultrasonic waves with different first times.

In this manner, the amplitude of the ultrasonic wave becomes smaller as the propagation distance between the transmission source and the receiver is increased. However, since the threshold voltages γ and Φ) remain constant, the first occurrence of the amplitude that crosses these threshold voltages is delayed in the ultrasonic wave with a longer propagation distance. It follows from this that, if the reception confirmed timing is the timing at which the voltage of the ultrasonic wave first crosses the threshold voltage γ or Φ), a change in propagation distance brings about a corresponding change in the time period from the reception of the ultrasonic wave to the reception confirmed timing. That is, the reception confirmed timing as indicated by the waveform of the received ultrasonic wave is changed. Such a change causes error variations in the result of calculation of propagation time.

In view of such a problem, the reception confirmed timing in the present embodiment is not a timing at which the voltage of the ultrasonic wave first crosses the threshold voltage γ or Φ), but such a timing is taken as a reception recognized timing. The time from the ultrasonic wave transmission timing to the reception recognized timing is calculated as a provisional propagation time (first time), and a rough estimate of a propagation distance is made based on the provisional propagation time.

The reception confirmed timing is the timing of the first occurrence of the zero-cross point after the voltage of the ultrasonic wave has crossed the threshold voltages γ and Φ for a predetermined number of times X. Here, the predetermined number X is varied according to the provisional propagation time (first time, estimated propagation distance), so as to adjust the reception confirmed timing of the waveform. In this way, the time from the reception of the ultrasonic wave to the reception confirmed timing can have a substantially constant length irrespective of the propagation distance.

The following specifically describes how this is performed.

Figure 8A:
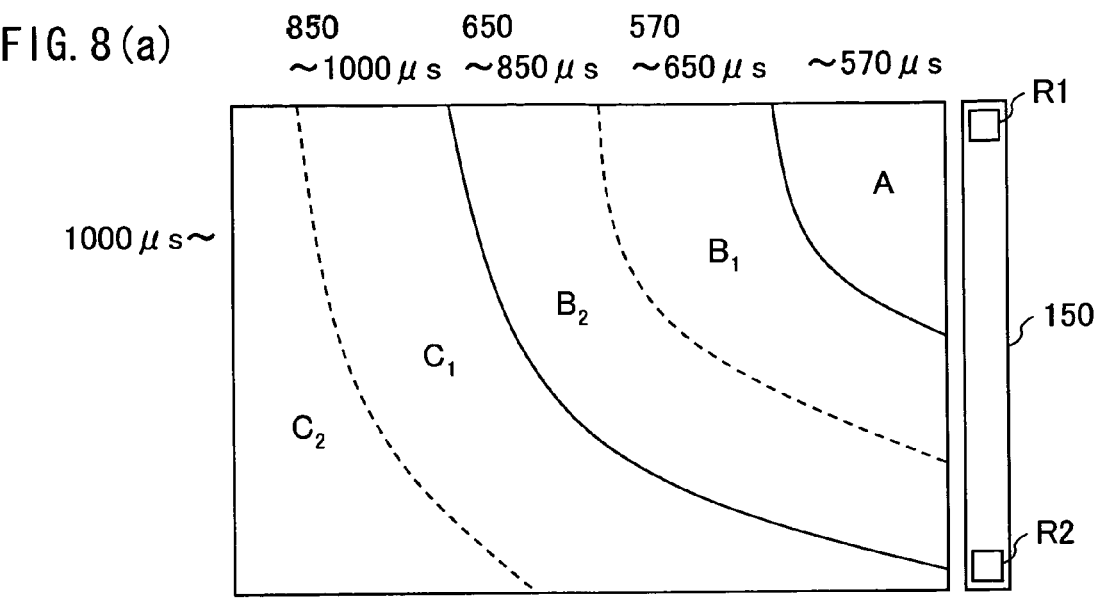
FIG. 8(a) is a chart for an ultrasonic wave receiver R1, explaining a relationship between a first time, which is the time period from the transmission timing to the reception recognized timing, and a position of the pen device.
Figure 8B:
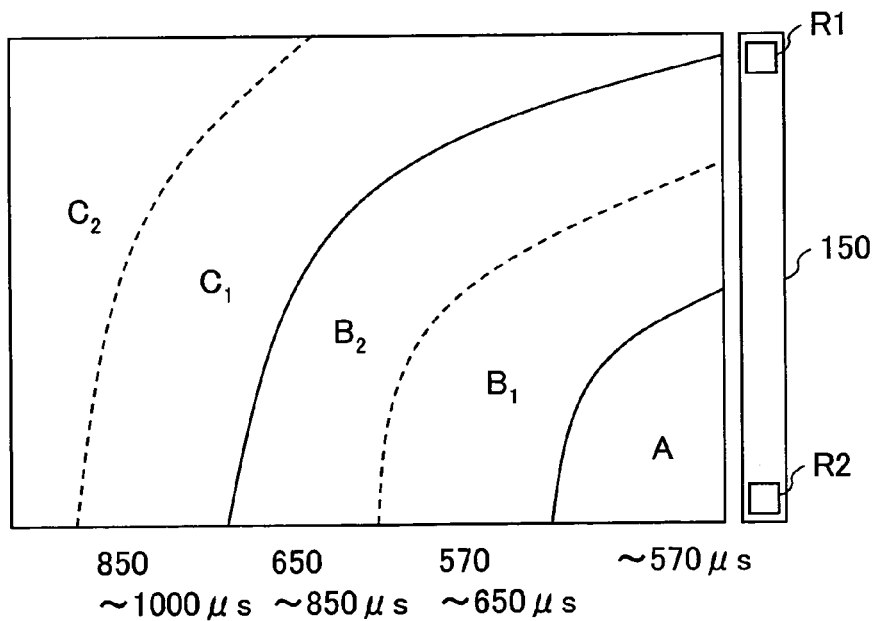
FIG. 8(b) is a chart for an ultrasonic wave receiver R2, explaining a relationship between the first time and a position of the pen device.
Figure 8C:
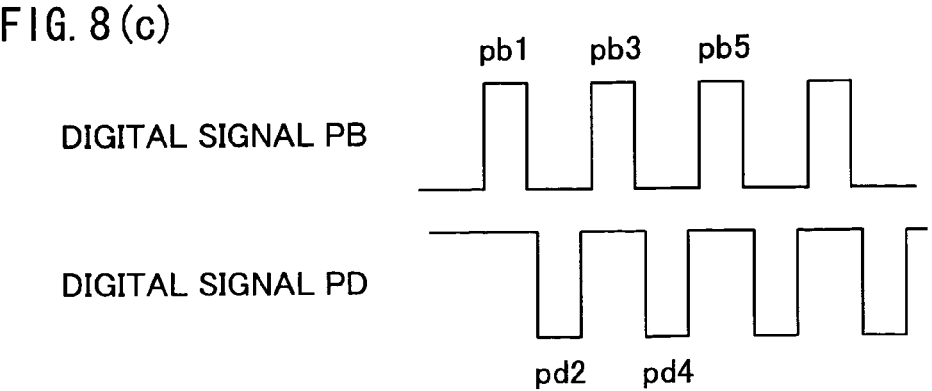
FIG. 8(c) is a waveform diagram of digital signals PB and PD generated based on the analog signal converted from the ultrasonic wave.

Referring to FIG. 8(a) and FIG. 8(b), when the first time ranges from 0 μs to 570 μs, the distance between any point in region A and the ultrasonic wave receiver R1 (R2) can be estimated as the propagation distance. Here, it is likely that the voltage with the amplitude w1 in the analog signal S crosses the threshold voltage γ, and that the pulses pb1, pd2, pb3, pd4, and pb5 are generated in the digital signals PB and PD, as shown in FIG. 8(c). Thus, for the first time of 0 μs to 570 μs, the predetermined number X is set to 10. In this way, the second arithmetic processing section 192 can detect the rise and fall of the pulses pb1, pd2, pb3, pd4, and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

FIG. 8(a) is a chart for the ultrasonic wave receiver R1, representing a relationship between a position of the pen device 110 and the first time of from the transmission timing to the reception recognized timing. FIG. 8(b) is a chart for the ultrasonic wave receiver R2, representing a relationship between a position of the pen device 110 and the first time. FIG. 8(c) is a waveform diagram for the digital signals PB and PD generated based on the analog signal S converted from the received ultrasonic wave.

When the first time ranges from 570 µs to 850 µs, the distance between any point in region B1, B2 and the ultrasonic wave receiver R1 (R2) can be estimated as the propagation distance, as shown in FIG. 8(a) and FIG. 8(b). Here, it is likely that the voltage with the amplitude w1 in the analog signal S does not cross the threshold voltage γ, and that the voltage with the amplitude w2 crosses the threshold voltage Φ. It is also likely that the pulse pb1 as shown in FIG. 8(c) is not generated in the digital signals PB and PD, while the pulses pd2, pb3, pd4, and pb5 are generated in the digital signals PB and PD. Thus, for the first time of 570 µs to 850 µs, the predetermined number X is set to 8. In this way, the second arithmetic processing section 192 can detect the rise and fall of the pulses pd2, pb3, pd4, and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

When the first time exceeds 850 µs, the distance between any point in region C1, C2 and the ultrasonic wave receiver R1 (R2) can be estimated as the propagation distance, as shown in FIG. 8(a) and FIG. 8(b). Here, it is likely that the voltages with the amplitudes w1 and w2 of the analog signal S do not cross the threshold voltages γ and Φ, and that the voltage with the amplitude w3 crosses the threshold voltage γ. It is also likely that the pulses pb1 and pd2 as shown in FIG. 8(c) are not generated in the digital signals PB and PD, while the pulses pb3, pd4, and pb5 are generated in the digital signals PB and PD. Thus, for the first time exceeding 850 µs, the predetermined number X is set to 6. In this way, the second arithmetic processing section 192 can detect the rise and fall of the pulses pb3, pd4, and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

That is, when the table 199 is set such that:
First time=0 µs to 570 µs→Predetermined number X=10;
First time=570 µs to 850 µs→Predetermined number X=8; and
First time>850 µs→Predetermined number X=6, the second arithmetic processing section 192 refers to the table 199 and changes the predetermined number X based on the first time sent from the first arithmetic processing section 191. In this way, the timing at which the zero-cross point occurs at the fall of the amplitude w5, which always occurs fifth, can be taken as the reception confirmed timing, irrespective of the propagation distance of the ultrasonic wave.

Thus, by setting the same number of amplitudes between the reception of the ultrasonic wave and the reception confirmed timing, the time from the reception of the ultrasonic wave to the reception confirmed timing can have a substantially constant length irrespective of the propagation distance. The second time, which is based on the reception confirmed timing is then calculated as the propagation time of the ultrasonic wave. In this way, the propagation time of the ultrasonic wave can be obtained with less error variation.

By the procedure described above according to the present embodiment, the reception timing detector 190a determines ultrasonic wave propagation time t1, and the reception timing detector 190b determines ultrasonic wave propagation time t2. As such, the coordinates (x, y) calculated based on the propagation time t1 and t2 can also be obtained with less error variation.

Figure 9:
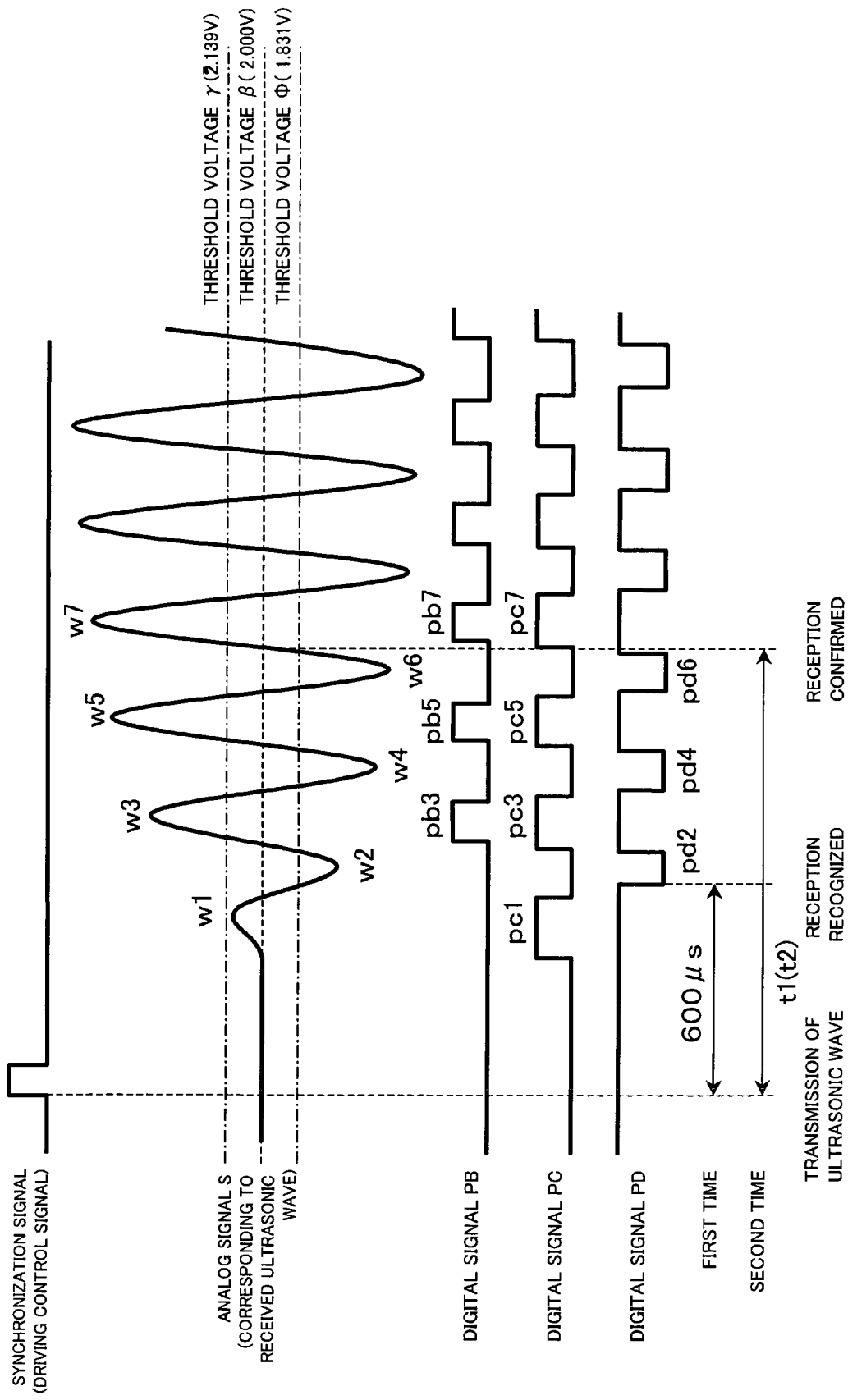
FIG. 9 is a waveform diagram for an ultrasonic wave whose transmission timing and reception recognized timing are separated by 600 μs and whose reception confirmed timing occurs at a rise of the waveform, representing an analog signal converted from the ultrasonic wave, digital signals generated from the analog signal, and a synchronization signal indicative of a transmission timing.

In the present embodiment, the timing of zero-cross point at the fall of the amplitude w5 in the analog signal S is set as the reception confirmed timing. However, the present invention is not just limited to this example. For example, as shown in FIG. 9, with the predetermined umber X adjusted such that the reception confirmed timing is the rise of the pulse pc7 of the digital signal PC immediately following the rise of the pulse pd6 of the digital signal PD, the timing of zero-cross point at the rise of the amplitude w7 in the analog signal S can be set as the reception confirmed timing.

Further, in the present embodiment, the timing of zero-cross point at the fall of the amplitude w5 in the analog signal S is set as the reception confirmed timing. However, the reception confirmed timing is not just limited to the timing of such zero-cross point. Specifically, other than the timing of such zero-cross point, the reception confirmed timing can be set anywhere between the voltage of the analog signal S having crossed the threshold voltage γ and Φ) for a predetermined number of times X, and the voltage of the analog signal S crossing the threshold voltage γ or Φ) again.

However, since the voltage of zero-cross point can easily be set as a threshold voltage, means for detecting the zero-cross point can be realized easily. It is therefore preferable, as in the present embodiment, that the reception confirmed timing be the timing of zero-cross point.

Further, in the present embodiment, the reception recognized timing detected by the first arithmetic processing section 191 is the timing at which the voltage of the analog signal S first crosses the threshold voltage γ or Φ. However, the reception recognized timing is not just limited to such a timing. Specifically, the reception recognized timing is not just limited to the timing at which the voltage of the analog signal S first crosses the threshold voltage γ or Φ) as long as it is the timing at which the voltage of the analog signal S crosses the threshold voltages γ and Φ for a predetermined number of times Y (first predetermined number, constant value).

Further, in the present embodiment, the ultrasonic wave propagation time t1 from the ultrasonic wave transmitter T to the ultrasonic wave receiver R1 is determined by the reception timing detector 190a, and the ultrasonic wave propagation time t2 from the ultrasonic wave transmitter T to the ultrasonic wave detector R2 is determined by the reception timing detector 190b. However, the present invention is not just limited to such a configuration. For example, the propagation time t2 may be determined according to conventional techniques, while the propagation time t1 is determined by the ultrasonic wave detector 190a. In other words, as long as at least one of the propagation time t1 and propagation time t2 is determined by the first arithmetic processing section 191 and the second arithmetic processing section 192, the coordinates (x, y) can be obtained with less error variation as compared with conventional coordinates input systems. However, with the propagation time t1 and propagation t2 both determined by the first arithmetic processing section 191 and the second arithmetic processing section 192 as in the present embodiment, the final coordinates (x, y) can be obtained more accurately with less error variation.

Note that, even though the foregoing description of the present embodiment was given through the case where the first amplitude of the ultrasonic wave received by the ultrasonic wave receivers R1 and R2 has a positive sign (upward), the present embodiment can also be implemented when the first amplitude has a negative sign.

As in the case of the positive amplitude, the ultrasonic wave reception confirmed timing detected by the second arithmetic processing section 192 is the timing of the first occurrence of the zero-cross point immediately after the voltage of the ultrasonic wave has crossed the threshold voltages γ and Φ for a predetermined number of times X. However, with the negative amplitude, the predetermined number X is varied in the manner described below.

Referring to FIG. 8(a) and FIG. 8(b), when the first time ranges from 0 μs to 570 μs, the distance between any point in region A and the ultrasonic wave receiver R1 (R2) can be estimated as the propagation distance. Here, it is likely that the analog signal S does not have amplitude w1, and that the voltage with the amplitude W2 (see FIG. 5) crosses the threshold voltage Φ. It is also likely that the pulse pb1 as shown in FIG. 8(c) is not generated in the digital signals PB and PD, while the pulses pd2, pb3, pd4, and pb5 are generated in the digital signals PB and PD. Thus, for the first time of 0 μs to 570 μs, the predetermined number X is set to 8. In this way, the second arithmetic processing section 192 can detect the rise and fall of the pulses pd2, pb3, pd4, and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

When the first time ranges from 570 μs to 850 μs, the distance between any point in region B1, B2 and the ultrasonic wave receiver R1 (R2) can be estimated as the propagation distance, as shown in FIG. 8(a) and FIG. 8(b). Here, it is likely that the voltage with the amplitude w2 in the analog signal S does not cross the threshold voltage Φ, and that the voltage with the amplitude w3 crosses the threshold voltage γ. It is also likely that the pulses pb1 and pd2 as shown in FIG. 8(c) are not generated in the digital signals PB and PD, while the pulses pb3, pd4, and pb5 are generated in the digital signals PB and PD. Thus, for the first time of 570 μs to 850 μs, the predetermined number X is set to 6. In this way, the second arithmetic processing section 192 can detect the rise and fall of the pulses pb3, pd4, and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

When the first time exceeds 850 μs, the distance between any point in region C1, C2 and the ultrasonic wave receiver R1 (R2) can be estimated as the propagation distance, as shown in FIG. 8(a) and FIG. 8(b). Here, it is likely that the voltage with the amplitude w3 in the analog signal S does not cross the threshold voltage γ, and that the voltage with the amplitude w4 crosses the threshold voltage Φ. It is also likely that the pulses pb1, pd2, and pb3 as shown in FIG. 8(c) are not generated in the digital signals PB and PD, while the pulses pd4 and pb5 are generated in the digital signals PB and PD. Thus, for the first time exceeding 850 μs, the predetermined number X is set to 4. In this way, the second arithmetic processing section 192 can detect the rise and fall of the pulses pd4 and pb5, and obtain the immediately following fall of the pulse pc5 of the digital signal PC as the reception confirmed timing. That is, the detected timing of the zero-cross point at the fall of the amplitude w5 in the analog signal S is taken as the reception confirmed timing.

In this manner, the timing of zero-cross point at the fall of the amplitude w5 can always be set as the reception confirmed timing irrespective of the propagation distance of the ultrasonic wave, even when the first amplitude of the ultrasonic wave received by the ultrasonic wave receivers R1 and R2 has a negative sign (downward).

Further, in the ultrasonic wave received by the ultrasonic wave receivers R1 and R2, there are cases where fluctuation is observed in the amplitude that first crosses the threshold voltage γ Φ. With fluctuating ultrasonic waves, accurate propagation time t1 and t2 cannot be obtained. Thus, when the received ultrasonic wave has fluctuations, the system may reject the ultrasonic wave so as not to calculate the propagation time. This can be carried out in the manner described below, taking into account the extent of fluctuation which varies depending on the propagation distance of the ultrasonic wave.

Referring to FIG. 8(a) and FIG. 8(b), when the first time ranges from 0 μs to 570 μs, the distance between any point in region A and the ultrasonic wave receiver R1 (R2) can be estimated as the propagation distance. Here, it is likely that pb1 is the first pulse in the digital signals PB and PD. Thus, when the width of the pulse pb1 is 2 μs (predetermined value) or shorter with the first time ranging from 0 μs to 570 μs, there is considered to be a fluctuation in the amplitude of the analog signal S, and the ultrasonic wave is rejected.

When the first time ranges from 570 μs to 650 μs, the distance between any point in region B1 and the ultrasonic wave receiver R1 (R2) can be estimated as the propagation distance, as shown in FIG. 8(a) and FIG. 8(b). Here, it is likely that pd2 is the first pulse in the digital signals PB and PD. Thus, when the width of the pulse pd2 is at or below 5.6 μs (predetermined value) with the first time ranging from 570 μs to 650 μs, there is considered to be a fluctuation in the amplitude of the analog signal S, and the ultrasonic wave is rejected.

When the first time ranges from 650 μs to 850 μs, the distance between any point in region B2 and the ultrasonic wave receiver R1 (R2) can be estimated as the propagation distance, as shown in FIG. 8(a) and FIG. 8(b). Here, it is likely that pd2 is the first pulse in the digital signals PB and PD. Thus, when the width of the pulse pd2 is at or below 2 μs with the first time ranging from 650 μs to 850 μs, there is considered to be a fluctuation in the amplitude of the analog signal S, and the ultrasonic wave is rejected.

When the first time ranges from 850 μs to 1000 μs, the distance between any point in region C1 and the ultrasonic wave receiver R1 (R2) can be estimated as the propagation distance, as shown in FIG. 8(a) and FIG. 8(b). Here, it is likely that pb3 is the first pulse in the digital signals PB and PD. Thus, when the width of the pulse pb3 is at or below 5.6 μs with the first time ranging from 850 μs to 1000 μs, there is considered to be a fluctuation in the amplitude of the analog signal S, and the ultrasonic wave is rejected.

When the first time exceeds 1000 μs, the distance between any point in region C2 and the ultrasonic wave receiver R1 (R2) can be estimated as the propagation distance, as shown in FIG. 8(a) and FIG. 8(b). Here, it is likely that pb3 is the first pulse in the digital signals PB and PD. Thus, when the width of the pulse pb3 is at or below 2 μs with the first time exceeding 1000 μs, there is considered to be a fluctuation in the amplitude of the analog signal S, and the ultrasonic wave is rejected.

By removing the fluctuating ultrasonic wave as above, the accuracy of calculated coordinates (x, y) can be further improved.

Referring to FIG. 2, in the coordinates input system according to the present embodiment, the ultrasonic wave receivers R1 and R2 are provided in the same receiver unit 150. However, the ultrasonic wave receivers R1 and R2 may be provided on separate units. For example, an additional unit for the components other than the ultrasonic wave receivers R1 and R2 shown in FIG. 2 may be provided, and the analog signals from the ultrasonic wave receivers R1 and R2 may be supplied to such an additional unit. In this way, a longer distance can be provided between the ultrasonic wave receivers R1 and R2, and the accuracy of calculation based on triangulation can be improved.

Note that, in the present embodiment, the pen device 110 is used as a pointing device. However, the pointing device is not just limited to such a pen device. That is, the external structure of the pointing device is not limited to the pen structure as long as the pointing device employs ultrasonic wave. For example, the pointing device may be a mouse equipped with an ultrasonic wave transmitter.

The coordinates input system of the present embodiment is connected to the computer 200 to input coordinates in the computer 200. However, the present invention is not limited to such a configuration. For example, the coordinates input system may be adapted to input coordinates through an operation screen of various devices, such as a video game, a car navigation system, a television set, and a portable phone with a display. That is, various modifications are possible as long as coordinates are entered through display means for displaying images.

Further, the present embodiment is also applicable to PDA (Personal Digital Assistant), with the display screen of PDA used as an input face, and the receiver unit 150 installed in the PDA.

Further, the functions (first step, second step) of the first arithmetic processing section 191 and the second arithmetic processing section 192 may be realized by causing a computer to read a program. The program may be stored in a computer-readable storage medium. In the present invention, the storage media may be program media realized by the main memory itself, or computer-readable storage media inserted in an externally provided program-reading device.

In either case, the stored program may be run by accessing it with a CPU, or by reading and downloading it into a program storage area (not shown). The downloading program is stored beforehand in the main unit.

The program media are detachable from the main unit, and may be various types of media carrying programs in a fixed manner. Specific examples of such program media include: tapes such as a magnetic tape or a cassette tape; magnetic disks such as a floppy disks or hard disk; optical disks such as a CD-ROM, MO, MD, and DVD; cards such as an IC card or optical card; and semiconductor memory such as a mask ROM, EPROM, EEPROM, and flash ROM.

In the case where the system includes means to be connected to an external communications network, the storage media may carry a program in a flowing manner by downloading it from the network through such connection means.

If the program is downloaded from the communications network, the downloading program may be stored beforehand in the main unit, or installed from a different storage medium. It should be noted here that the content of the storage medium is not just limited to a program but may be data.

A coordinates input system of the present invention includes: a pointing device including an ultrasonic wave transmitting section; an ultrasonic wave receiving section for receiving an ultrasonic wave transmitted from the ultrasonic wave transmitting section; a coordinates calculating section for calculating coordinates of the pointing device based on a propagation time of the ultrasonic wave transmitted from the ultrasonic wave transmitting section and received by the ultrasonic wave receiving section; a first arithmetic section for calculating a first time, which is a time period from the transmission timing of the ultrasonic wave to a reception recognized timing at which a wave height value of the ultrasonic wave received by the ultrasonic wave receiving section crosses a predetermined threshold for a first predetermined number of times; and a second arithmetic section for calculating a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again, wherein the second arithmetic section varies the second predetermined number according to the first time.

According to the foregoing configuration, the first arithmetic section calculates a first time, which is a time period from the transmission timing of the ultrasonic wave to a reception recognized timing at which a wave height value of the ultrasonic wave received by the ultrasonic wave receiving section crosses a predetermined threshold for a first predetermined number of times. Based on the duration of the first time, a rough estimate of the propagation distance can be made for the ultrasonic wave transmitted from the ultrasonic wave transmitting section and received by the ultrasonic wave receiving section.

According to the foregoing configuration, the second arithmetic section calculates a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again.

Here, the height of amplitudes of the ultrasonic wave varies depending on the propagation distance. Accordingly, the number of amplitudes that exceed the predetermined threshold during a certain time period after the reception of the ultrasonic wave also varies according to the propagation distance.

In view of such, according to the foregoing configuration, the second predetermined number is changed according to the first time (rough estimate of the distance between the ultrasonic wave transmitter and the ultrasonic wave receiver). This enables the reception confirmed timing to be adjusted in such a manner that the same number of amplitudes is always obtained before the reception confirmed timing of the ultrasonic wave regardless of the propagation distance.

As described above, the ultrasonic wave has the same number of amplitudes before the reception confirmed timing, irrespective of the propagation distance. With the second time based on the reception confirmed timing calculated as the propagation time of the ultrasonic wave, the coordinates of the pointing device calculated based on the propagation time can be obtained with less error variation.

It is preferable in the coordinates input system of the present invention that the reception confirmed timing referred to by the second arithmetic section be a timing where a zero-cross point is detected immediately after the wave height value has crossed the predetermined threshold for the second predetermined number of times.

According to this configuration, the reception confirmed timing is the timing at which the zero-cross point immediately after the wave height has crossed the predetermined threshold for the second predetermined number of times is detected. Since it is convenient to set the zero-cross point as the threshold, the reception confirmed timing can easily be detected.

In a coordinates input system of the present invention, the first time and the second predetermined number are associated with each other in a table, and the second arithmetic section varies the second predetermined number according to the first time, by referring to the table.

According to this configuration, the second arithmetic section changes the second predetermined number according to the first time, by referring to the table in which the first time and the second predetermined number are associated with each other.

The ultrasonic wave includes amplitudes above and below the center of the waveform. It is therefore preferable that the predetermined threshold includes a threshold γ above a center of the ultrasonic wave, and a threshold Φ below the center of the ultrasonic wave.

A coordinates input system of the present invention may be adapted so that the ultrasonic wave receiving section includes: a first receiver for receiving the ultrasonic wave; and a second receiver, disposed with a predetermined distance from the first receiver, for receiving the ultrasonic wave, and that the first arithmetic section calculates the first time corresponding to the ultrasonic wave received by the first receiver, and the first time corresponding to the ultrasonic wave received by the second receiver, and that the second arithmetic section calculates a propagation time corresponding to the ultrasonic wave received by the first receiver, and a propagation time corresponding to the ultrasonic wave received by the second receiver.

For the calculation of the coordinates of the pointing device, the principle of triangulation can be employed. In this case, two ultrasonic wave receiving sections need to be provided and separated from each other, in order to determine a propagation time of the ultrasonic wave transmitted from the ultrasonic wave transmitting section and received by one of the ultrasonic wave receiving sections, and a propagation time of the ultrasonic wave transmitted from the ultrasonic wave transmitting section and received by the other ultrasonic wave receiving section.

According to the foregoing configuration, the first arithmetic section and the second arithmetic section both calculate the propagation time of the ultrasonic wave transmitted from the ultrasonic wave transmitting section and received by the first receiving section, and the propagation time of the ultrasonic wave transmitted from the ultrasonic wave transmitting section and received by the second receiving section. In this way, more accurate coordinates can be obtained for the pointing device, compared with the case where the first arithmetic section and the second arithmetic section calculate only one of the propagation times.

A coordinates input system of the present invention may be adapted so that the second arithmetic section does not calculate the second time based on the ultrasonic wave received by the ultrasonic wave receiving section, when a width of an amplitude generated in the ultrasonic wave is smaller than a predetermined value.

Depending on the type of received ultrasonic wave, fluctuation may be observed in the generated amplitudes. An accurate second time cannot be obtained when the ultrasonic wave has fluctuating amplitudes. According to the foregoing configuration, the second time based on the ultrasonic wave received by the ultrasonic wave receiving section is not calculated when a width of an amplitude generated in the ultrasonic wave is smaller than a predetermined value. In this way, the accuracy of the calculated second time can be improved.

A coordinates input system of the present invention may be adapted so that the second arithmetic section varies the predetermined value according to the first time.

The extent of fluctuation in the generated amplitude of the ultrasonic wave varies according to the propagation distance of the ultrasonic wave. According to the foregoing configuration, the predetermined value is varied according to the first time. In this way, accurate detection can be made even for ultrasonic waves with fluctuating amplitudes.

In order to achieve the foregoing object, the present invention provides a coordinates input method in which coordinates of a pointing device including an ultrasonic wave transmitting section is calculated based on a propagation time of a ultrasonic wave transmitted from the ultrasonic wave transmitting section and received by an ultrasonic wave receiving section, the method including: the first step of calculating a first time, which is a time period from the transmission timing of the ultrasonic wave to a reception recognized timing at which a wave height value of the ultrasonic wave received by the ultrasonic wave receiving section crosses a predetermined threshold for a first predetermined number of times; and the second step of calculating a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again, wherein the second arithmetic section varies the second predetermined number according to the first time.

According to the foregoing procedure, the method calculates a first time, which is a time period from the transmission timing of the ultrasonic wave to a reception recognized timing at which a wave height value of the ultrasonic wave received by the ultrasonic wave receiving section crosses a predetermined threshold for a first predetermined number of times. Based on the duration of the first time, a rough estimate of the propagation distance can be made for the ultrasonic wave transmitted from the ultrasonic wave transmitting section and received by the ultrasonic wave receiving section.

According to the foregoing procedure, the method calculates a second time as the propagation time of the ultrasonic wave, the second time being a time period from the transmission timing of the ultrasonic wave to a reception confirmed timing, which is a timing after the wave height value has crossed the predetermined threshold for a second predetermined number of times and before the wave height value crosses the predetermined threshold again.

Here, the height of amplitudes of the ultrasonic wave varies depending on the propagation distance. Accordingly, the number of amplitudes that exceed the predetermined threshold during a certain time period after the reception of the ultrasonic wave also varies according to the propagation distance.

In view of such, according to the foregoing procedure, the second predetermined number is changed according to an estimated distance between the ultrasonic wave transmitter and the ultrasonic wave receiver (first time). This enables the reception confirmed timing to be adjusted in such a manner that the same number of amplitudes is always obtained before the reception confirmed timing of the ultrasonic wave regardless of the propagation distance.

As described above, the ultrasonic wave has the same number of amplitudes before the reception confirmed timing, irrespective of the propagation distance. With the second time based on the reception confirmed timing calculated as the propagation time of the ultrasonic wave, the coordinates of the pointing device calculated based on the propagation time can be obtained with less error variation.

The coordinates input method may be realized by a computer. This can be carried out with a coordinate input program for causing a computer to execute the first and second steps. The present invention also includes a computer-readable storage media storing such a coordinates input program.

A coordinates input system and a coordinates input method of the present invention are used for pointing devices employing ultrasonic wave. More specifically, the invention is applicable to a wide variety of pointing devices used to specify a specific location on a display. Some of the examples of such pointing devices include: a pointing device for inputting coordinates in a personal computer; a pointing device for inputting coordinates in PDA (Personal Digital Assistant); a pointing device for inputting coordinates in a video game; and a pointing device for inputting coordinates in a car navigation system.

It should be appreciated that the present invention is not just limited to the foregoing embodiments, and the invention may be varied in many ways within the scope of the claims. Further, the technical means described in the foregoing embodiments may be suitably combined to constitute a new embodiment, and all such combinations of the technical means are intended to fall within the scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A coordinates input system comprising:
    a pointing device including an ultrasonic wave transmitting device;
    an ultrasonic wave receiving device for receiving an ultrasonic wave transmitted from the ultrasonic wave transmitting device;
    a coordinates calculating device for calculating coordinates of the pointing device based on a propagation time of the ultrasonic wave transmitted from the ultrasonic wave transmitting device and received by the ultrasonic wave receiving device;
    a first arithmetic device for calculating a first time, which is a time period from the transmission timing of the ultrasonic wave to a reception recognized timing at which a wave height value of the ultrasonic wave received by the ultrasonic wave receiving device crosses a predetermined threshold for a first predetermined number of times; and
    a second arithmetic device for calculating a second time as the propagation time of the ultrasonic wave, the second time being relatively greater than the first time and being a time period from the transmission timing of the ultrasonic wave to a reception confirmed timing, which is a timing after the wave height value has crossed the predetermined threshold for a second predetermined number of times, the second predetermined number of times being greater than the first predetermined number of times, and before the wave height value crosses the predetermined threshold again, wherein the second arithmetic device varies the second predetermined number of times according to the first time.

2. The coordinates input system as set forth in claim 1, wherein the reception confirmed timing referred to by the second arithmetic device is a timing where a zero-cross point is detected immediately after the wave height value has crossed the predetermined threshold for the second predetermined number of times.

3. The coordinates input system as set forth in claim 1,
    wherein the first time and the second predetermined number are associated with each other in a table, and
    wherein the second arithmetic device varies the second predetermined number according to the first time, by referring to the table.

4. The coordinates input system as set forth in claim 1, wherein the predetermined threshold includes a threshold γ above a center of the ultrasonic wave, and a threshold Φ below the center of the ultrasonic wave.

5. The coordinates input system as set forth in claim 1, wherein the ultrasonic wave receiving device includes:
    a first receiver for receiving the ultrasonic wave; and
    a second receiver, disposed with a predetermined distance from the first receiver, for receiving the ultrasonic wave;
    wherein the first arithmetic device calculates the first time corresponding to the ultrasonic wave received by the first receiver, and the first time corresponding to the ultrasonic wave received by the second receiver; and
    wherein the second arithmetic device calculates a propagation time corresponding to the ultrasonic wave received by the first receiver, and a propagation time corresponding to the ultrasonic wave received by the second receiver.

6. The coordinates input system as set forth in claim 1, wherein the second arithmetic device does not calculate the second time based on the ultrasonic wave received by the ultrasonic wave receiving device, when a width of an amplitude generated in the ultrasonic wave is smaller than a predetermined value.

7. The coordinates input system as set forth in claim 6, wherein the second arithmetic device varies the predetermined value according to the first time.

8. A coordinates input method in which coordinates of a pointing device including an ultrasonic wave transmitting device is calculated based on a propagation time of a ultrasonic wave transmitted from the ultrasonic wave transmitting device and received by an ultrasonic wave receiving device, said method comprising:
    the first step of calculating a first time, which is a time period from the transmission timing of the ultrasonic wave to a reception recognized timing at which a wave height value of the ultrasonic wave received by the ultrasonic wave receiving device crosses a predetermined threshold for a first predetermined number of times; and
    the second step of calculating a second time as the propagation time of the ultrasonic wave, the second time being relatively greater than the first time and being a time period from the transmission timing of the ultrasonic wave to a reception confirmed timing, which is a timing after the wave height value has crossed the predetermined threshold for a second predetermined number of times, the second predetermined number of times being greater than the first predetermined number of times, and before the wave height value crosses the predetermined threshold again, wherein the second arithmetic device varies the second predetermined number of times according to the first time.

9. A computer-readable storage medium storing a coordinates input program for causing a computer to calculate coordinates of a pointing device including an ultrasonic wave transmitting device based on a propagation time of a ultrasonic wave transmitted from the ultrasonic wave transmitting device and received by an ultrasonic wave receiving device, said program causing the computer to execute:

the first step of calculating a first time, which is a time period from the transmission timing of the ultrasonic wave to a reception recognized timing at which a wave height value of the ultrasonic wave received by the ultrasonic wave receiving device crosses a predetermined threshold for a first predetermined number of times; and the second step of calculating a second time as the propagation time of the ultrasonic wave, the second time being relatively greater than the first time and being a time period from the transmission timing of the ultrasonic wave to a reception confirmed timing, which is a timing after the wave height value has crossed the predetermined threshold for a second predetermined number of times, the second predetermined number of times being greater than the first predetermined number of times, and before the wave height value crosses the predetermined threshold again, wherein the second arithmetic device varies the second predetermined number of times according to the first time.

* * * * *